United States Patent
Mohr et al.

(10) Patent No.: US 7,882,853 B2
(45) Date of Patent: Feb. 8, 2011

(54) ROTARY FEED-THROUGH WITH LEAKAGE SENSOR

(75) Inventors: Peter Mohr, Wiggensbach (DE); Wolfgang Bechteler, Biessenhofen (DE); Stephan Gast, Schwabsoien (DE); Hans Leidl, Kempten (DE)

(73) Assignee: OTT-Jakob GmbH & Co. Spanntechnik KG, Lengenwang (DE)

( * ) Notice: Subject to any disclaimer, the term of this patent is extended or adjusted under 35 U.S.C. 154(b) by 1145 days.

(21) Appl. No.: 11/460,269

(22) Filed: Jul. 27, 2006

(65) Prior Publication Data

US 2007/0034265 A1   Feb. 15, 2007

(30) Foreign Application Priority Data

Aug. 13, 2005   (DE) .................. 10 2005 038 459

(51) Int. Cl.
*F16L 27/00* (2006.01)
(52) U.S. Cl. .................. 137/580; 137/557; 285/98; 285/272
(58) Field of Classification Search .................. 137/540, 137/580, 557; 285/98, 272
See application file for complete search history.

(56) References Cited

U.S. PATENT DOCUMENTS

| | | | | |
|---|---|---|---|---|
| 3,501,174 | A | * | 3/1970 | Walker .................. 285/279 |
| 3,799,585 | A | | 3/1974 | Frost |
| 4,726,397 | A | * | 2/1988 | Stich .................. 137/580 |
| 4,796,282 | A | | 1/1989 | Yoshida |
| 5,056,047 | A | * | 10/1991 | Sondergeld .................. 702/47 |
| 5,922,941 | A | | 7/1999 | Winkler et al. |
| 6,406,065 | B1 | * | 6/2002 | Ott et al. .................. 285/120.1 |
| 6,592,126 | B2 | * | 7/2003 | Davis .................. 277/320 |
| 2006/0017283 | A1 | | 1/2006 | Maier |
| 2006/0150729 | A1 | | 7/2006 | Nestle |

FOREIGN PATENT DOCUMENTS

| | | |
|---|---|---|
| DE | 10225272 | 6/2002 |
| DE | 10256537 | 7/2004 |
| DE | 10259395 | 7/2004 |
| EP | 0392838 A2 | 10/1990 |
| EP | 0799670 | 10/1997 |
| JP | 2004028164 | 1/2004 |

OTHER PUBLICATIONS

European Search Report dated Feb. 13, 2008, for EP06014205.

* cited by examiner

*Primary Examiner*—Stephen Hepperle
*Assistant Examiner*—Andrew J Rost
(74) *Attorney, Agent, or Firm*—Martin Fleit; Paul D. Bianco; Fleit Gibbons Gutman Bongini & Bianco PL

(57) ABSTRACT

The invention pertains to a rotary feed-through for supplying a fluid to a rotating machine part with a hollow shaft (3) that is rotatably supported in a housing (1, 2) and has a first sliding surface (29), with a sealing bushing (31) that is arranged in a rotationally fixed fashion within the housing (1, 2) coaxial to the shaft (3) and has a second sliding surface (30) for contacting the first sliding surface (29), and with a collecting chamber (27) that is arranged within the housing (1, 2) and serves for collecting the leakage fluid escaping between the two sliding surfaces (29, 30). The leakage fluid collected within the rotary feed-through can be monitored with the aid of a detection channel (26, 33, 34, 37, 39, 47) in the housing (1, 2) that is connected to the collecting chamber (27) and contains a leakage sensor (41).

11 Claims, 2 Drawing Sheets

ROTARY FEED-THROUGH WITH LEAKAGE SENSOR

FIELD OF THE INVENTION

The invention pertains to a rotary feed-through.

BACKGROUND OF THE INVENTION

A rotary feed-through of this type for supplying a fluid to a rotating machine part is known from DE 102 25 272 A1. This rotary feed-through features a hollow shaft that is rotatably supported within a housing and has a first sliding surface, a sealing bushing that is arranged in the housing in a rotationally fixed fashion coaxial to the hollow shaft and has a second sliding surface for contacting the sliding surface of the hollow shaft, and a collecting chamber that is arranged within the housing and in which the leakage fluid escaping between the sliding surfaces of the rotating hollow shaft and the rotationally fixed sealing bushing can be collected. This collecting chamber is connected to a leakage opening, through which the leakage fluid collected in the collecting chamber can be discharged. Since only small quantities of the fluid being conveyed through the rotary feed-through usually escape at the interface between the two sliding surfaces, it normally suffices to occasionally drain or to permanently discharge via a corresponding line the leakage fluid collected in the collecting chamber. However, larger quantities of leakage fluid can escape in certain situations during operation. This is associated with the risk of the leakage fluid backing up within the collecting chamber such that the rotary feed-through may become damaged.

SUMMARY OF THE INVENTION

The invention is based on the objective of developing a rotary feed-through of the initially cited type that makes it possible to monitor the leakage fluid collected within the rotary feed-through.

This objective is attained with a rotary feed-through as set forth in the independent claim or claims. Practical embodiments and advantageous additional developments of the invention are disclosed in the dependent claims.

In the inventive rotary feed-through, a separate detection channel provided in the housing is connected to the collecting chamber and contains a leakage sensor for measuring the leakage fluid. The detection channel branches off the collecting chamber and is realized in such a way that the leakage fluid normally only flows through the detection channel if it is not properly discharged via the conventional collecting chamber and the corresponding leakage opening or if a malfunction occurs in the discharge line, e.g., due to kinking or clogging. The leakage fluid only flows through the additional detection channel and is detected at the end thereof by the leakage sensor arranged at this location if it backs up within the collecting chamber. This makes it possible to detect a functionally critical state of the rotary feed-through and to prevent damage to the rotary feed-through.

In one preferred embodiment, the leakage sensor is realized in the form of a flow sensor that preferably operates in accordance with the calorimetric measuring principle and features a temperature compensation circuit. This makes it possible to detect not only aqueous fluids, but also non-polar fluids such as, e.g., mineral oils. Naturally, it would also be possible to utilize other suitable sensors.

The leakage sensor is preferably connected to a printed circuit board with an evaluation circuit that is arranged within the housing. The entire sensor arrangement and the evaluation circuit are thus integrated within the housing and therefore very well shielded from dirt and electromagnetic interferences.

In one particularly advantageous embodiment of the invention, the detection channel extends through the housing of the rotary feed-through in the form of a labyrinth and features an inner leakage channel that extends along the hollow shaft, as well as at least one outer leakage channel that is radially offset relative to the inner leakage channel.

The radially inner leakage channel is preferably realized in the form of an annular channel that is formed by a first annular gap between a clamping bushing arranged on the inner end of the hollow shaft and a sealing sleeve arranged in the housing, by passages between the outer rings and the inner rings of the bearings for supporting the rotating hollow shaft, by a second annular gap between the annular collar of the hollow shaft and the housing, and by a radial gap on the face of the annular collar that faces the bearings. In one preferred embodiment, the fluid connection between the collecting channel and the inner leakage channel is realized in the form of a radial gap between an end flange of the clamping bushing and the rear face of the sealing sleeve.

The radially outer leakage channel is preferably formed by at least one axial bore in a front housing that extends parallel to the hollow shaft and by a receptacle bore in a rear housing that is connected to the axial bore. The fluid connection between the inner leakage channel and the outer leakage channel is realized in the form of a radial channel that is arranged in the front region of the rotary feed-through.

BRIEF DESCRIPTION OF THE DRAWINGS

Other peculiarities and advantages of the invention are disclosed in the following description of one preferred embodiment that refers to the figures. The figures show:

FIG. 1, a first longitudinal section through a rotary feed-through, and

DETAILED DESCRIPTION OF THE INVENTION

Figure 1:
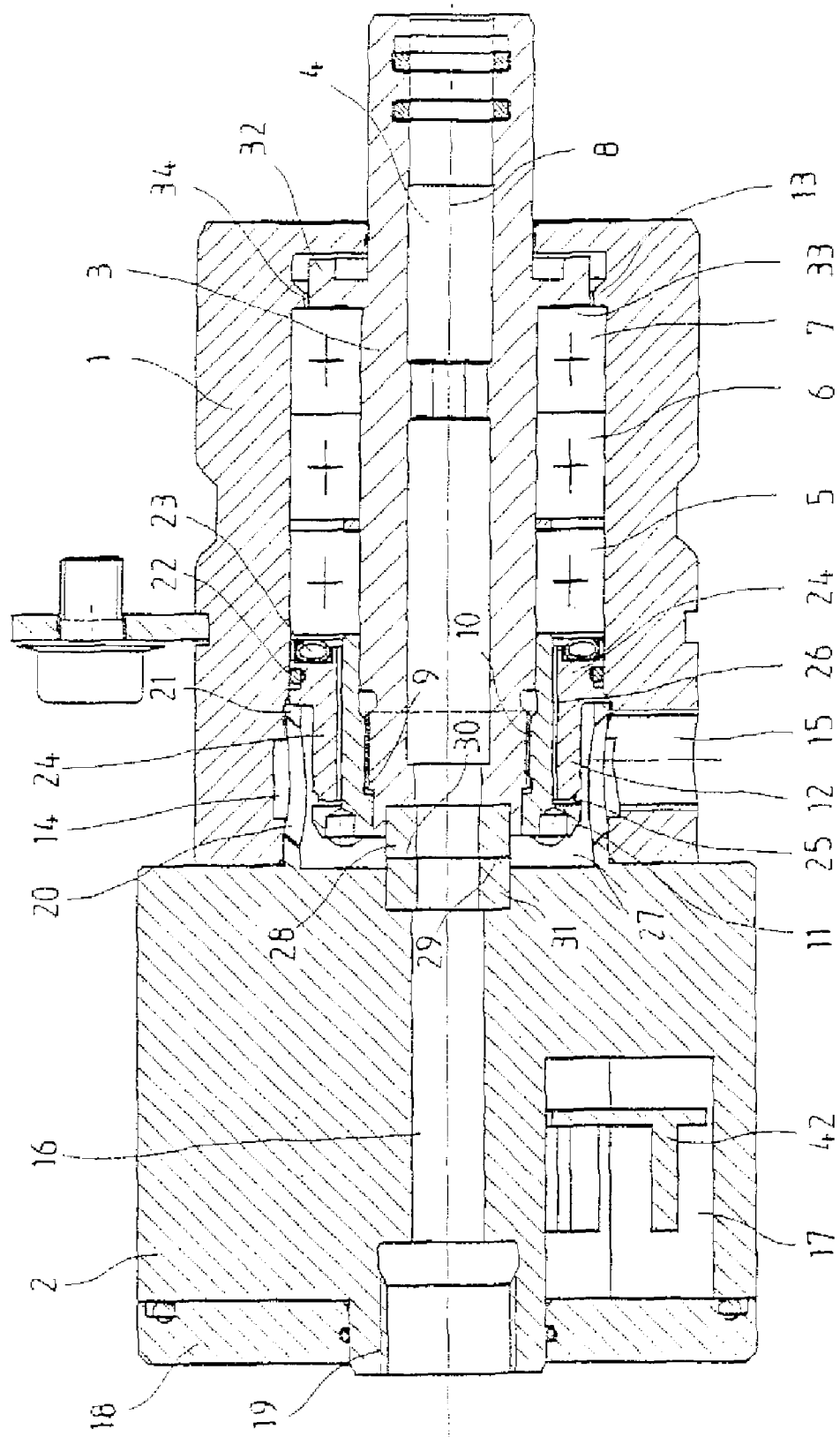
Figure 2:
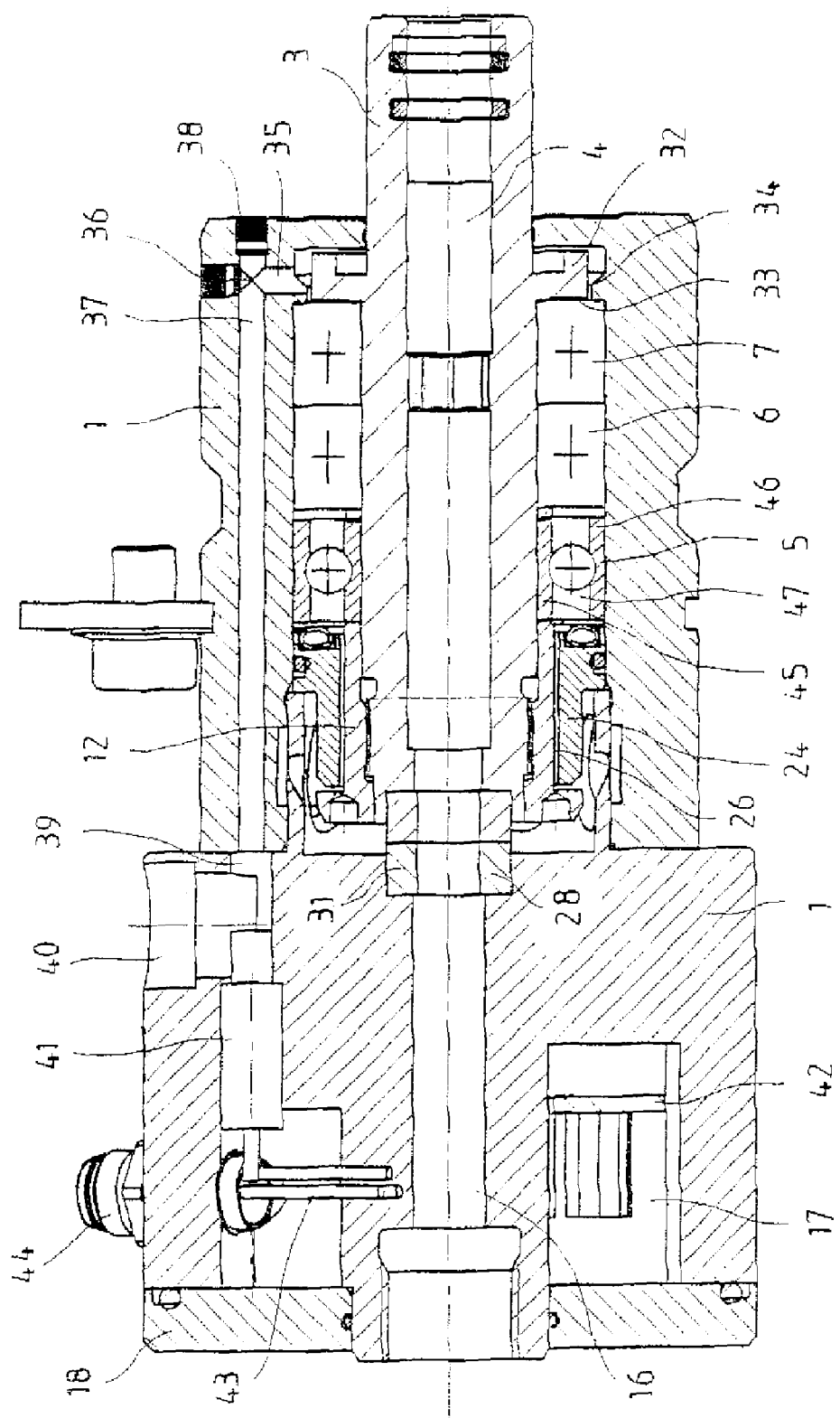
FIG. 2, a second longitudinal section through the rotary feed-through according to FIG. 1.

The rotary feed-through schematically illustrated in FIGS. 1 and 2 contains a housing with a front housing part 1 that is arranged on the right side in the figures and a rear housing part 2 that is tightly connected to the front housing part 1. A hollow shaft 3 with a central through-channel 4 is supported in the front housing part 1 by means of several successively arranged bearings 5, 6, and 7 such that it is rotatable about a central axis 8. A clamping bushing 12 provided with an internal thread 10 and an end flange 11 is screwed on an external thread 9 on the inner end of the hollow shaft 3 arranged in the housing part 1. This clamping bushing 12 prestresses the bearings 5, 6, and 7 against an annular step 13 in the interior of the housing part 1. For example, a hollow tension rod of a tool tensioner integrated into a machine tool work spindle can be inserted in a radially sealed fashion into through-channel 4 at the outer end of the hollow shaft 3 that lies on the right side in the figures. A ring channel 14 with a leakage opening 15 that leads outward is provided on the inner wall of the front housing part 1 in the region of the inner end of the hollow shaft 3.

The rear housing part 2 contains a central through-channel 16 and a receptacle chamber 17 that surrounds the through-channel in a U-shaped fashion and that can be closed with the cover 18. A fluid supply line, e.g., for supplying cooling lubricant to the machine tool work spindle can be connected to the stationary rear housing part 2 by means of a threaded bore 19 on the rear end of the through-channel 16. On its face that points to the front housing part 1, the rear housing part 2 features a hollow-cylindrical projection 21 that is provided with radial through-openings 20 and protrudes into the front housing part 1, wherein said projection presses a sealing sleeve 24 provided with a radial seal 22 and a prestressing spring 23 against the bearing 5. A radial gap 25 is formed between the rear face of the stepped sealing sleeve 24 and the front side of the end flange 11 of the clamping bushing 12, and a first annular gap 26 is formed between the inner wall of the sealing sleeve 24 and the outer wall of the clamping bushing 12. A collecting chamber 27 is formed within the hollow-cylindrical projection 21 of the rear housing part 2 and is connected to the ring channel 14 and the leakage opening 15 via the radial through-openings 20.

A first sealing bushing 28 inserted into the rear end of the hollow shaft 3 is connected in a rotationally fixed fashion to the hollow shaft and rotates therewith. This sealing bushing is inserted into a widened section of the through-channel 4 on the rear end of the hollow shaft 3. The sealing bushing 28 features a sliding surface 29 on its rear face that contacts a sliding surface 30 on the front face of a second sealing bushing 31 arranged in a rotationally fixed fashion in the rear housing part 2. The second sealing bushing 31 is arranged on the front end of the supply channel 16 extending through the rear housing part 2 and is axially pressed against the first sealing bushing 28 by a not-shown pressure spring. The two sealing bushings 28 and 31 preferably consist of a wear-resistant and thermally stable material, e.g., a ceramic or the like. The collecting chamber 27 arranged in the region of the two sliding surfaces 29 and 30 serves for collecting a fluid that can escape in the form of leakage fluid between the two sliding surfaces 29 and 30 of the sealing bushings 28 and 31. The leakage fluid collected within the collecting chamber 27 can be discharged via the radial through-openings 20, the ring channel 14 and the leakage opening 15.

FIG. 2, in particular, shows that the hollow shaft 3 features an annular collar 32 that is arranged in front of the bearing 7 in the front region of the housing part 1. A narrow annular gap 33 is formed on the face of the annular collar 32 that faces the bearings between the bearing 7 and the face of the annular collar 32. A second annular gap 34 is formed between the outer side of the annular collar 32 and the housing part 1. A radial channel 35 that is realized in the form of a radial bore in this case and that is sealed on the outer side of the housing part 1 with a plug 36 in the form of a threaded pin leads into the second annular gap 34. This radial channel 35 is connected to an axial bore 37 that extends parallel to the hollow shaft 3 through the entire front housing part 1 radially outside the bearings 5-7. The axial bore 37 is arranged within the housing part 1 on the diametrically opposite side of the leakage opening 15.

The axial bore 37 is sealed with a plug 38 that is also realized in the form of a threaded pin on its right front end in FIG. 2 and leads into an enlarged receptacle bore 39 with a radial drain opening 40 in the rear housing part 2 on its opposite rear end. The leakage sensor 41 that is realized in the form of a flow sensor in this case protrudes into the receptacle bore 39 and is connected to a printed circuit board 42 accommodated within the receptacle chamber 17 in the rear housing part 2. The corresponding evaluation electronics for evaluating the signals acquired by the leakage sensor 40 [sic; 41] may be arranged on this printed circuit board 42. Lines 43 lead from the printed circuit board 42 to a socket 44 for connecting the evaluation electronics to an external control or display device.

An inner leakage channel extending along the hollow shaft is formed by the first annular gap 26 between the clamping bushing 12 arranged on the inner end of the hollow shaft 3 and the sealing sleeve 24, by the passages 47 between the outer rings 45 and the inner rings 46 of the bearings 5-7, by the second annular gap 34 between the annular collar 32 of the hollow shaft 3 and the housing part 1, and by the annular gap 33, wherein this inner leakage channel is connected to the collecting chamber 27 via the radial gap 25 between the end flange 11 of the clamping bushing 12 and the rear face of the sealing sleeve 24. FIG. 2 is simplified in that only the bearing 5 is illustrated in the form of a section. The two other bearings 6 and 7 also feature corresponding passages 47. An outer leakage channel is formed by the axial bore 37 and the receptacle bore 39 and is connected to the inner leakage channel via the radial channel 35.

If leakage fluid backs up within the collecting chamber 27 in the previously described rotary feed-through, it can flow to the inner leakage channel via the radial gap 25 and from there through the radial channel 35 to the outer leakage channel, at the end of which it is detected by the leakage sensor 41.

The invention claimed is:

1. A rotary feed-through for supplying fluid to a rotating machine part comprising:
    a hollow shaft (3) that is rotatably supported in a housing (1, 2) and has a first sliding surface (29);
    a sealing bushing (31) that is arranged in a rotationally fixed fashion within the housing (1, 2) coaxial to the hollow shaft (3);
    a second sliding surface (30) for contacting the first sliding surface (29);
    a collecting chamber (27) that is arranged within the housing (1, 2) and configured for collecting leakage fluid escaping between the two sliding surfaces (29, 30);
    a detection channel (26, 33, 34, 37, 39, 47) arranged within the housing (1, 2) and connected to the collecting chamber (27), the detection channel (26, 33, 34, 37, 39, 47) including an inner leakage channel (26, 33, 34, 47) extending along the hollow shaft (3) and at least one outer leakage channel (37, 39) radially offset relative to the inner leakage channel; and
    a leakage sensor (41) connected to the detection channel (26, 33, 34, 37, 39, 47); wherein the outer leakage channel (37, 39) is formed by at least one coaxial bore (37) that extends parallel to the hollow shaft (3) in a front housing part (1) and by a receptacle bore (39) in a rear housing part (2) of the housing (1, 2) that is connected to the axial bore (37).

2. The rotary feed-through according to claim 1, wherein the inner leakage channel (26, 33, 34, 47) is formed by an annular gap (26) between a clamping bushing (12) arranged on an inner end of the hollow shaft (3) and a sealing sleeve (24) arranged in the housing (1, 2), by passages (47) between outer and inner rings (45, 46) of bearings (5, 6, 7) for supporting the rotating hollow shaft (3), by an annular gap (34) between an annular collar (32) of the hollow shaft (3) and the housing (1, 2), and by an annular gap (33) on a face of the annular collar (32) that faces the bearings (5, 6, 7).

3. The rotary feed-through according to claim 2, wherein the inner leakage channel (26, 34, 47) is connected to the collecting chamber (27) via a radial gap (25) between an end flange (11) of the clamping bushing (12) and a rear face of the sealing sleeve (24).

4. The rotary feed-through according to claim 1, wherein the inner leakage channel (26, 34, 47) is connected to the outer leakage channel (37, 39) via a radial channel (25).

5. The rotary feed-through according to claim 1, wherein the leakage sensor (41) is configured in a form of a flow sensor and operable in accordance with a calorimetric measuring principle.

6. The rotary feed-through according to claim 1, wherein the leakage sensor (41) is connected to a printed circuit board (42) with evaluation electronics arranged within the housing (1, 2).

7. The rotary feed-through according to claim 6, wherein the printed circuit board (42) is accommodated in a receptacle chamber (17) of a rear housing part (2) of the housing (1, 2).

8. The rotary feed-through according to claim 6, wherein the printed circuit board (42) is connected to a socket (44) via lines (43).

9. The rotary feed-through according to claim 1, wherein the inner detection channel, the outer detection channel, and the leakage sensor are configured for detection of a fluid back up within the collection chamber.

10. The rotary feed-through according to claim 1, wherein the axial bore (37) is arranged within the first housing part (1) on a diametrically opposite side of a leakage opening (15) of the collecting chamber (27).

11. The rotary feed-through according to claim 1, wherein the leakage sensor (41) protrudes into the receptacle bore (39) of the rear housing part (2).

* * * * *